(12) United States Patent
Ross

(10) Patent No.: US 7,208,223 B2
(45) Date of Patent: Apr. 24, 2007

(54) COMPOSITE SHEET MATERIAL

(75) Inventor: Leslie Ross, Aldershot (GB)

(73) Assignee: Premium Aircraft Interiors UK Limited, Warwick (GB)

( * ) Notice: Subject to any disclaimer, the term of this patent is extended or adjusted under 35 U.S.C. 154(b) by 0 days.

(21) Appl. No.: 10/699,077

(22) Filed: Oct. 31, 2003

(65) Prior Publication Data
US 2004/0101674 A1 May 27, 2004

(30) Foreign Application Priority Data
Nov. 6, 2002 (GB) ................................. 0225937.2

(51) Int. Cl.
B32B 27/34 (2006.01)

(52) U.S. Cl. ................ 428/319.3; 428/319.7; 428/318.4; 428/116

(58) Field of Classification Search ............ 428/318.4, 428/319.3, 319.7, 116
See application file for complete search history.

(56) References Cited

U.S. PATENT DOCUMENTS

| 3,755,063 | A | * | 8/1973 | Massey et al. ............... 428/215 |
| 4,740,530 | A | * | 4/1988 | Pip ............................. 521/149 |
| 4,956,217 | A | * | 9/1990 | Heitkamp .................... 428/116 |
| 5,039,567 | A | * | 8/1991 | Landi et al. ................. 428/116 |
| 5,106,668 | A | * | 4/1992 | Turner et al. ............... 428/116 |
| 5,238,725 | A | * | 8/1993 | Effing et al. ................ 428/116 |
| 5,316,604 | A |   | 5/1994 | Fell ............................. 156/82 |
| 5,444,881 | A |   | 8/1995 | Landi et al. |
| 5,484,500 | A |   | 1/1996 | Kaufmann et al. ......... 156/198 |
| 5,701,621 | A | * | 12/1997 | Landi et al. .................. 5/691 |
| 6,413,613 | B1 | * | 7/2002 | Byma ......................... 428/116 |
| 2003/0087079 | A1 | * | 5/2003 | Okabe et al. |

FOREIGN PATENT DOCUMENTS

| DE | 196 12 127 A1 | 10/1997 |
| EP | 0 400 599 | 12/1990 |
| EP | 0 624 459 | 11/1994 |
| EP | 0 839 633 | 5/1998 |
| GB | 2 345 662 | 7/2000 |
| WO | WO 200158687 A1 * | 8/2001 |

OTHER PUBLICATIONS

The article "ABS Quick Facts", 2 pages.*
The article "Thermoplastic POlymer products," 2 pages.*
English Abstract of RD 405061A, "Low-Colour pigmented Polyimide Film-comprises polyimide Homopolymer and Copolymer Films derived from 4,4-oxy diphthalic dianhyride and aromatic diamine," Jan. 10, 1998, 2 pages.*

* cited by examiner

Primary Examiner—Hai Vo
(74) Attorney, Agent, or Firm—Davis Bujold & Daniels, P.L.L.C.

(57) ABSTRACT

Composite sheet material comprises a core (12) formed from cellular material having a respective skin of continuous sheet material on each side thereof. Both the core and the skins are formed of thermoplastic materials and the skins are attached to the core by a thermoplastic adhesive having a fusion temperature less than that of both the core and the skins.

6 Claims, 2 Drawing Sheets

COMPOSITE SHEET MATERIAL

FIELD

This invention relates to composite sheet material of the type comprising a core formed from cellular material having a respective skin of continuous sheet material on each side thereof.

The term "cellular material" is used herein to mean a solid material containing air-filled or gas filled voids, for example, honeycomb or foam material.

RELATED ART

In a known composite material of this type, the honeycomb material comprises paper honeycomb impregnated with a phenolic lacquer resin. Each skin comprises a glass fibre mat also impregnated with phenolic resin. The skins are secured to the core using an epoxy based film adhesive. When the resin is cured, a piece of such composite material comprises a lightweight rigid panel that is particularly suitable for use in aircraft cabin interiors.

However, this material suffers from the disadvantage that, once the resin has cured, the resulting panel is permanently rigid. If it is desired to form radiuses or rebates in the material, it is necessary to make cuts in the skin on the inside of such a radius in order to allow the material to be bent. After the required radius has been formed, it is necessary for the cuts in the skin to be "glassed over" with phenolic resin.

Another disadvantage is that the skins tend to delaminate in use, particularly when adhesive tape is used to secure carpet to such material. When the tape is pulled off, the surface of the skin is pulled away, exposing some of the glass fibres. Subsequent application of adhesive tape to the damaged area results in such tape adhering directly to the exposed glass fibres. On the next occasion time when the carpet is removed, such exposed glass fibres tend to pull away with the tape, thus causing further delamination.

SUMMARY OF THE INVENTION

It is one object of the invention to provide a composite material that is not subject to these disadvantages.

According to one aspect of the invention, in a composite material of the type described above, both the core and the skins are formed of thermoplastic materials and the skins are attached to the core by a thermoplastic adhesive having a fusion temperature less than that of both the core and the skins.

The effect of this is that if the material is heated to above the fusion temperature of the adhesive and then bent to form a radius therein, the skins move relative to the core rather than the skin on the outside of the radius being stretched and the skin on the inside of the radius being compressed. When the material has cooled, the two skins form continuous smooth surfaces round the radius and no subsequent glassing is necessary.

According to another aspect of the invention, in a composite material of the type described above, both the core and the skins are formed of thermoplastic materials and the material is compressed to a thickness less than the sum of the thicknesses of the core and the skins while at a temperature higher than the softening temperature of the core.

This compression causes the edges of the cells of the core to distort so as to increase their contact area with the skins and thus increase the strength of the bond therebetween.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
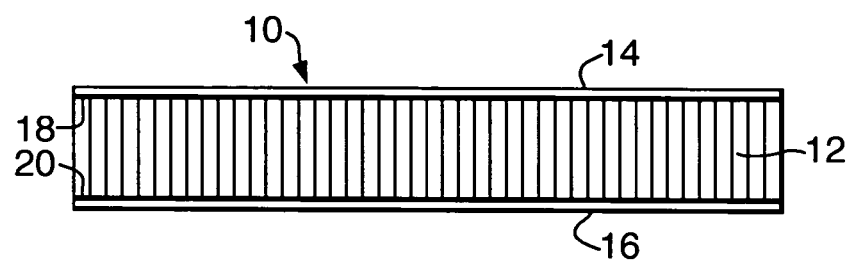
FIG. 1 is an edge view of a panel formed from composite material in accordance with a first embodiment of the invention.
Figure 2:
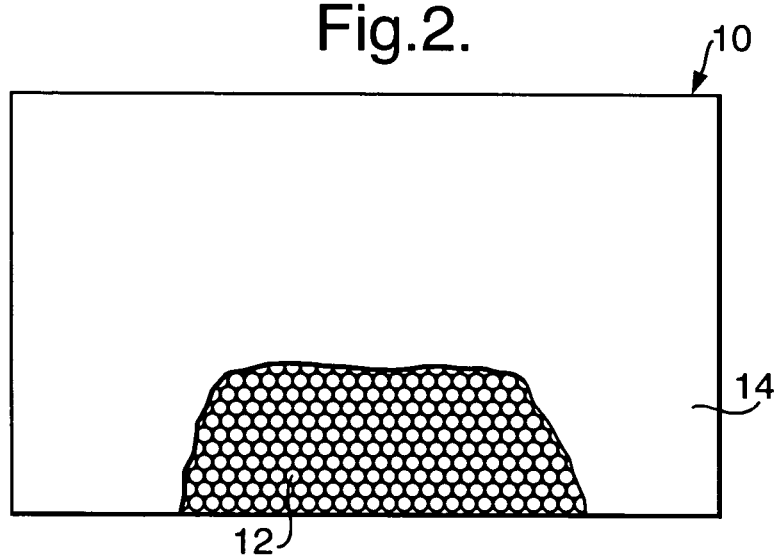
FIG. 2 is a plan view of the panel shown in FIG. 1 with part of the upper skin removed.
Figure 3:
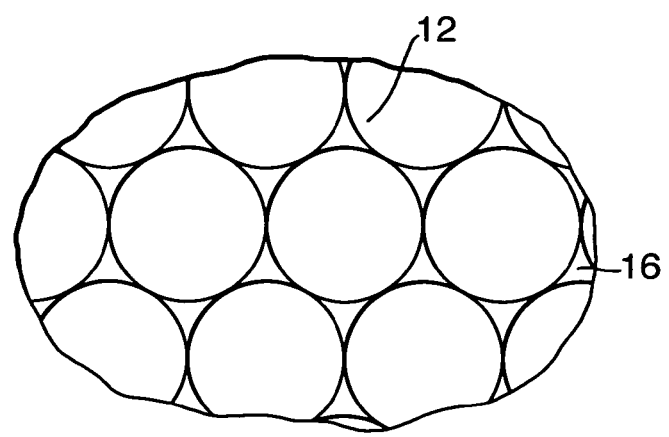
FIG. 3 is a scrap view on an enlarged scale of part of the panel shown inn FIG. 2.

FIGS. 1 to 3 show a panel 10 formed from a honeycomb core 12 having the ends of the honeycomb cells covered by respective skins 14 and 16 which are secured to the core 12 by respective layers 18 and 20 of thermoplastic adhesive.

The core 12 is formed from extruded tubes, of circular cross-section. The material of the core 12 is polyetherimid, which may, for example comprise Trauma-Lite Honeycombs Type PEI 3.5-70 supplied by Trauma-Lite Limited, PO Box 456, Manchester M62 LL, United Kingdom. In this material, the diameter of the tubes is 3.5 mm and the material density is 70 kilos per cubic meter. This material can be thermoformed at temperatures up to 170° C.

The skins 14 and 16 may comprise Cetex GI0303 reinforced thermoplastic laminate, supplied by Ten Cate Advanced Composites, Campbellweg 30, 7443 PV Nijverdal, Netherlands. This material is in accordance with Boeing Aircraft Corporation's Material Specification BMS8-353 and can be thermoformed at temperatures in the range 150° C. to 300° C.

The thermoplastic adhesive may be a polyester based thermoplastic web such as Sharnet Web Sh4275 supplied by Bostic Findley Limited, Alderscote Road, Leicester LE4 68W, England. This has a fusion temperature of 130° C.

Consequently, the preferred temperature for bending and shaping composite material made from these materials is 150° C.

When it is desired to bend the material, an entire panel is heated (for example in an oven) heated to a temperature between the fusion temperature of the adhesive and the fusion temperatures of the core and the skins. The panel is then bent to form a radius therein. The skins move relative to the core so that the skin on the outside of the radius no longer reaches the edge of the core while the skin on the inside of the radius projects beyond the edge of the core. When the material has cooled, the two skins form continuous smooth surfaces round the radius and no subsequent glassing is necessary. Finally, the edges of the panel are cut away to the required peripheral shape, thereby removing surplus skin and those parts of the core that are no longer covered by skin on both sides.

If a component formed from a composite material in accordance with the invention is damaged, the damaged material may be cut away and replaced by fresh material which is bonded into place with the use of a hot iron. This type of repair can be performed within an aircraft cabin, avoiding the need to remove the relevant equipment from the aircraft.

Figure 4:
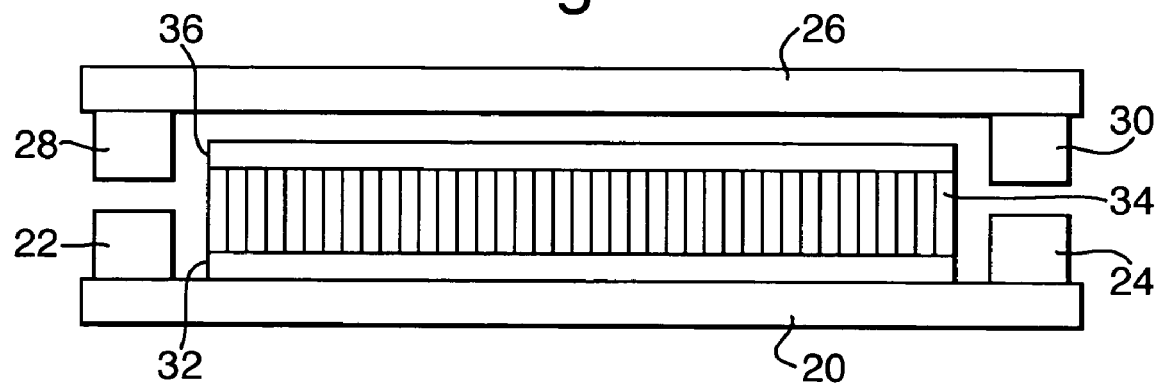
FIG. 4 is a side view of a press for forming a panel of composite material in accordance with a second embodiment of the invention, the press being in its open position.

FIG. 4 shows a press having a lower platen 20 carrying spacers 22 and 24, and an upper platen 26 carrying spacers 28 and 30. The lower spacers 22 and 24 are aligned with respective upper spacer 28 and 30.

In order to form a panel of composite material, a skin 32 of reinforced thermoplastic laminate, such as Cetex GI0303, is placed on the lower platen 20 and a layer of thermoplastic adhesive such as Sharnet Web Sh4275 (not shown) is place on top of the skin 32. Next a core 34 formed of polyetherimid circular cross-section tubes, for example Trauma-Lite Honeycombs Type PEI 3.5-70 is placed on the layer of adhesive. A second layer of adhesive (not shown) is placed on top of the core 34 and finally a second skin 36 of reinforced thermoplastic laminate is placed on the second layer of adhesive. The overall thickness of the core and the two skins is greater than the combined height of each pair of spacers 22, 28 and 24, 30.

Figure 5:
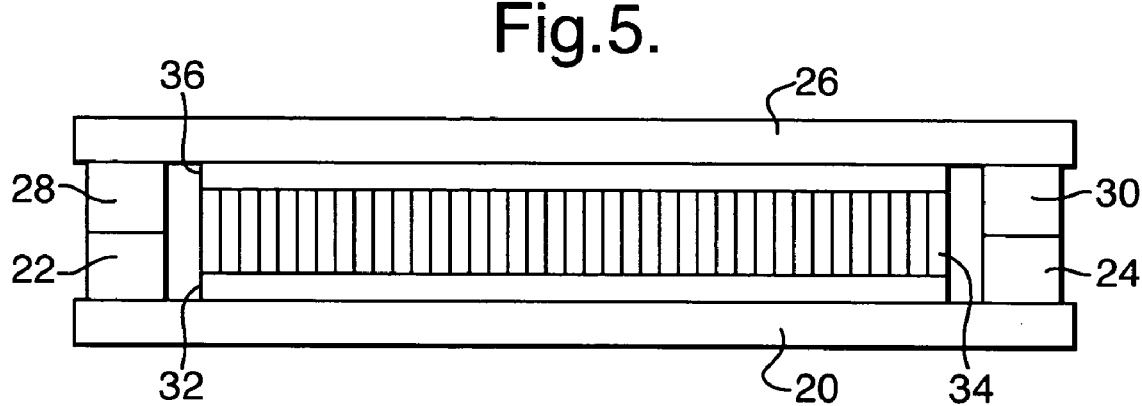
FIG. 5 is a side view of the press shown in FIG. 4, in its closed position.
Figure 6:
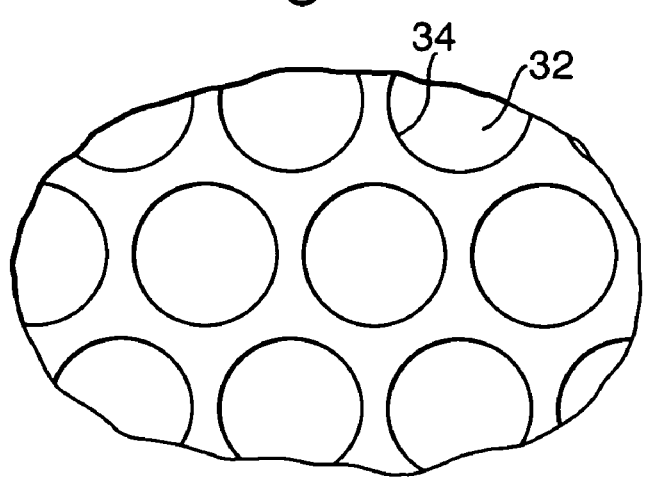
FIG. 6 is a scrap view, similar to FIG. 3, of a panel formed on the press shown in FIGS. 4 and 5.

The platens 20 and 26 are then heated to a temperature above the fusion temperature of the adhesive layers (150° C. for the materials described above) and the press is closed to the position shown in FIG. 5. The force exerted by the platens 20 and 26 causes each end of the tubes forming the core 34 to be distorted so as to bridge the interstices between adjacent tubes and increase the surface area available to make contact with the adjacent skin, as shown in FIG. 6. This produces a stronger bond between the core and its skins than is obtained with a panel of the type shown in FIGS. 1 to 3.

The invention claimed is:

1. A composite sheet material comprising:
a rigid core (34) of honeycomb cellular material having a first and a second side and an initial thickness; and the rigid core (34) being formed of a plurality of individually extruded tubes arranged adjacently and in parallel and in a hexagonal pattern to form a honeycomb structure in which each tube has a first end in contact with a first side skin and a second end in contact with a second side skin;
the first skins is formed of continuous sheet material on the first side of the rigid core and the second skin is formed of continuous sheet material on the second side of the rigid core and the first and the second skins each have an initial thickness; and
the first and the second skins (32, 36) are formed of a reinforced thermoplastic laminate thermoformable in a temperature range of 150° C. to 300° C.; and
the tubes are formed of polyetherimid material thermoformable in a temperature range up to 170° C.; and
the composite sheet material being formed of the rigid core (34) and the first and the second skins (32,36) is uniformly compressed while heated to a temperature in a thermoformable range of 150° C. to 170° C. so as to have a uniform thickness less than a sum of the initial thickness of the rigid core (34), the first side skin (32) and the second side skin (36);
wherein in each tube, regions of a wall of the tube adjacent the first and second ends of the tube are distorted so as to bridge interstices between the first ends and the second ends of each adjacent ones of the tubes to thereby increase the contact surface area between the tube and the first side and the second side skins and walls.

2. The composite sheet material according to claim 1, wherein the first and the second skins (32, 36) are secured to the rigid core (34) using a separate polyester base thermoplastic adhesive which has a fusion temperature of less than 150° C.

3. The composite sheet material according to claim 1, wherein the extruded tubes have circular cross-section.

4. The composite sheet material according to claim 1, wherein the rigid core (12, 34) has a lower fusion temperature than a fusion temperature of the first skin (14, 16) and of the second skin (32, 36).

5. A composite sheet material comprising:
a rigid core (12, 34) of honeycomb cellular material having an initial thickness and being formed by a plurality of individually extruded tubes arranged adjacently and in parallel and in a hexagonal pattern to form a honeycomb; and
a first skin of continuous sheet material on a first side of the rigid core (12, 34) and a second skin of continuous sheet material on a second side of the rigid core, and the first skin (14, 32) and the second skin (16, 36) each have an initial thickness;
wherein each tube has a first end in contact with a first side skin and a second end in contact with a second side skin;
the tubes are formed of polyetherimid material thermoformable in a temperature range up to 170° C.
the first and the second skins (14,16; 32, 36) are formed of a reinforced thermoplastic laminate thermoformable in a temperature range of 150° C. to 300° C.; and the first and the second skins (14, 16; 32, 36) are each attached to a corresponding side of the rigid core by a polyester base thermoplastic adhesive having a fusion temperature less than 150° C.; and
the composite sheet material formed of the rigid core, the first and the second skins is uniformly compressed, while heated to a temperature in a thermoformable range of 150° C. to 170° C., so as to have a uniform thickness less than a sum of the initial thicknesses of the rigid core and the first and second skins so that in each tube, regions of a wall of the tube adjacent the first and second ends of the tube are distorted so as to bridge interstices between the first ends and the second ends of each of adjacent ones of the tubes to thereby increase the contact surface area between the tube and the first side and second side skins and walls.

6. A composite sheet material comprising:
a rigid core (34) of honeycomb cellular material having a first side and a second side and an initial thickness and formed of a plurality of individually extruded tubes arranged adjacently and in parallel and in a hexagonal pattern to form a honeycomb with each tube extending from a first end at the first side to a second end at the second side; and
a first skin of continuous sheet material on the first side and a second skin of continuous sheet material on the second side of side, with the first and the second skins each having an initial thickness;

wherein the tubes are formed of polyetherimid material thermoformable in a temperature range of 150° C. to 170° C.; and the first and the second skins are formed of a reinforced thermoplastic laminate thermoformable in a temperature range of approximately 170° to 300° C.; and in each tube, regions of a wall of the tube adjacent the first and second ends of the tube are distorted so as to bridge interstices between the first ends and the second ends of each of adjacent ones of the tubes to thereby increase the contact surface area between the tube and the first side and second side skins and walls, wherein the composite sheet material has a uniform thickness.

* * * * *